(12) United States Patent
Diallo et al.

(10) Patent No.: US 10,210,744 B2
(45) Date of Patent: Feb. 19, 2019

(54) MINIATURE WIRELESS ALARM DEVICE

(71) Applicants: CENTRE NATIONAL DE LA RECHERCHE SCIENTIFIQUE, Paris (FR); UNIVERSITE DE NICE-SOPHIA ANTIPOLIS, Nice (FR); ENGINEERING SECURITY, Grasse (FR)

(72) Inventors: Aliou Diallo, Nice (FR); Robert Staraj, Saint-Paul (FR); Philippe Le Thuc, Grasse (FR); Imen Cherif, Grasse (FR)

(73) Assignees: CENTRE NATIONAL DE LA RECHERCHE SCIENTIFIQUE, Paris (FR); UNIVERSITE DE NICE-SOPHIA ANTIPOLIS, Nice (FR); ENGINEERING SECURITY, Grasse (FR)

( * ) Notice: Subject to any disclaimer, the term of this patent is extended or adjusted under 35 U.S.C. 154(b) by 0 days.

(21) Appl. No.: 15/572,114

(22) PCT Filed: May 4, 2016

(86) PCT No.: PCT/EP2016/060098
§ 371 (c)(1),
(2) Date: Dec. 14, 2017

(87) PCT Pub. No.: WO2016/177837
PCT Pub. Date: Nov. 10, 2016

(65) Prior Publication Data
US 2018/0137741 A1 May 17, 2018

(30) Foreign Application Priority Data
May 6, 2015 (FR) ..................... 15 54078

(51) Int. Cl.
*G08B 25/01* (2006.01)
*G06K 7/10* (2006.01)
(Continued)

(52) U.S. Cl.
CPC ....... *G08B 25/016* (2013.01); *G06K 7/10366* (2013.01); *G06K 19/0704* (2013.01);
(Continued)

(58) Field of Classification Search
None
See application file for complete search history.

(56) References Cited

U.S. PATENT DOCUMENTS 3,825,833 A * 7/1974 Bogue .................. G08B 5/002
340/539.1
4,121,160 A * 10/1978 Cataldo .............. G07C 9/00944
340/321

(Continued)

FOREIGN PATENT DOCUMENTS

WO 00/04522 A1 1/2000

*Primary Examiner* — Curtis J King
(74) *Attorney, Agent, or Firm* — Baker & Hostetler LLP

(57) ABSTRACT

An alarm device comprises an RFID circuit that is configured to store identification information and is coupled to an antenna designed to receive and to emit, from and to an RFID reader, signals at the frequency of the RFID reader, and a switch coupled to the antenna and able to be activated by a user, enabling the antenna to be matched to the frequency of the RFID reader. The alarm device comprises the RFID circuit, the antenna and the switch designed to be incorporated into an object worn by a user, and enable the alarm to be activated discreetly.

9 Claims, 3 Drawing Sheets

(51) Int. Cl.
*G06K 19/07* (2006.01)
*H01Q 1/22* (2006.01)
*H01Q 1/27* (2006.01)
*H01Q 9/16* (2006.01)
*G08B 25/00* (2006.01)

(52) U.S. Cl.
CPC ........... *H01Q 1/2208* (2013.01); *H01Q 1/273* (2013.01); *H01Q 9/16* (2013.01); *G08B 25/009* (2013.01)

(56) References Cited

U.S. PATENT DOCUMENTS

| | | | | |
|---|---|---|---|---|
| 4,300,129 A * | 11/1981 | Cataldo | ................... | G08B 6/00 116/DIG. 17 |
| 4,354,189 A * | 10/1982 | Lemelson | ............. | E05B 49/006 340/10.33 |
| 5,223,818 A * | 6/1993 | Polo | ..................... | G08B 25/016 200/DIG. 2 |
| 5,307,047 A * | 4/1994 | Morioka | ............ | G08B 21/0297 340/321 |
| 5,438,315 A * | 8/1995 | Nix | ..................... | G08B 21/0297 200/DIG. 2 |
| 5,742,233 A * | 4/1998 | Hoffman | ............... | G08B 21/023 340/10.41 |
| 5,923,253 A * | 7/1999 | Anastasiou | .......... | G08B 25/016 128/903 |
| 6,020,826 A * | 2/2000 | Rein | ...................... | G06K 19/04 235/380 |
| 6,198,394 B1 * | 3/2001 | Jacobsen | ............... | A61B 5/1112 340/573.1 |
| 6,239,700 B1 * | 5/2001 | Hoffman | ............... | G08B 21/023 340/539.13 |
| 6,281,854 B1 * | 8/2001 | Ohoka | ................... | H01Q 1/273 343/718 |
| 6,310,539 B1 * | 10/2001 | Rye | ...................... | G08B 25/016 340/321 |
| 7,180,420 B2 * | 2/2007 | Maurer | .................. | G06Q 10/08 340/311.2 |
| 7,979,026 B2 * | 7/2011 | Hulvey | ............... | H04W 52/287 340/572.7 |
| 9,713,434 B2 * | 7/2017 | Barak | .................. | A61B 5/0507 |
| 2003/0151524 A1 * | 8/2003 | Clark | .................. | A61B 5/0031 340/870.07 |
| 2006/0011729 A1 * | 1/2006 | Sarela | .................... | A61B 5/681 235/472.01 |
| 2006/0103538 A1 * | 5/2006 | Daniel | ..................... | A43B 3/00 340/574 |
| 2007/0058295 A1 * | 3/2007 | Lasser | ................... | G06K 19/04 360/131 |
| 2007/0194926 A1 * | 8/2007 | Bayley | ............... | G06K 19/0723 340/572.1 |
| 2007/0200684 A1 * | 8/2007 | Colby | .................. | G06K 19/072 340/10.51 |
| 2007/0216537 A1 * | 9/2007 | Park | ........................ | G04C 21/34 340/691.1 |
| 2009/0033463 A1 * | 2/2009 | Posamentier | ...... | G06K 19/0723 340/10.1 |
| 2010/0052912 A1 | 3/2010 | Arneson et al. | | |
| 2010/0123581 A1 * | 5/2010 | Hatfield | ............. | G06K 19/0716 340/572.3 |
| 2010/0253521 A1 * | 10/2010 | Williams, Sr. | ......... | G06Q 10/06 340/572.1 |
| 2011/0090082 A1 * | 4/2011 | Boston | ................. | G08B 25/016 340/539.13 |
| 2011/0121082 A1 * | 5/2011 | Phaneuf | ............... | G06K 19/041 235/492 |
| 2011/0210931 A1 * | 9/2011 | Shai | ........................ | G06F 3/014 345/173 |
| 2011/0248833 A1 * | 10/2011 | Ritamaki | ........... | G06K 19/0705 340/10.33 |
| 2011/0260859 A1 | 10/2011 | Maurer | | |
| 2012/0129571 A1 * | 5/2012 | Charrat | ................ | H04B 5/0068 455/550.1 |
| 2012/0139708 A1 * | 6/2012 | Paradiso | ................. | G06F 3/014 340/10.1 |
| 2012/0212339 A1 * | 8/2012 | Goldblatt | ............. | G08B 25/016 340/539.11 |
| 2012/0242481 A1 * | 9/2012 | Gernandt | ........... | G06K 19/0705 340/539.13 |
| 2014/0240088 A1 * | 8/2014 | Robinette | .......... | G08B 13/1427 340/5.61 |
| 2015/0109101 A1 * | 4/2015 | Gomez | ............... | G07C 9/00111 340/5.54 |
| 2015/0109106 A1 * | 4/2015 | Gomez | ............... | G06K 19/045 340/10.1 |
| 2015/0109107 A1 * | 4/2015 | Gomez | ............... | G06K 19/045 340/10.1 |
| 2015/0178532 A1 * | 6/2015 | Brule | .................. | G06K 19/0717 340/5.61 |
| 2015/0235120 A1 * | 8/2015 | Warren | ............... | G06K 19/07762 235/439 |
| 2015/0243149 A1 * | 8/2015 | Alexander | ........... | G08B 25/016 340/539.11 |
| 2016/0180697 A1 * | 6/2016 | Ros | ...................... | G08B 25/016 340/539.11 |
| 2016/0259952 A1 * | 9/2016 | Van Rens | ........ | G06K 19/07766 |
| 2016/0278168 A1 * | 9/2016 | Bourke, III | ............ | H05B 6/062 |
| 2016/0292563 A1 * | 10/2016 | Park | .................. | G06K 19/07762 |
| 2017/0116845 A1 * | 4/2017 | See | ...................... | G08B 25/016 |
| 2017/0169675 A1 * | 6/2017 | Burgess | ................. | G08B 13/08 |
| 2017/0195009 A1 * | 7/2017 | Nagai | ................... | H04B 5/0031 |
| 2018/0012471 A1 * | 1/2018 | Bauer | ................. | G08B 21/0269 |

* cited by examiner

MINIATURE WIRELESS ALARM DEVICE

CROSS-REFERENCE TO RELATED APPLICATIONS

This application is a National Stage of International patent application PCT/EP2016/060098, filed on May 4, 2016, which claims priority to foreign French patent application No. FR 1554078, filed on May 6, 2015, the disclosures of which are incorporated by reference in their entirety.

FIELD OF THE INVENTION

The invention is in the field of alarm systems, and in particular relates to miniature wireless alarm systems.

PRIOR ART

Conventional prevention against attacks, burglaries and other crimes of the same nature is commonly achieved using various tools, such as video surveillance, interlocking doors at the entrances of stores, such as jewelry stores or banks, or even by virtue of the installation of alert buttons that are often concealed underneath checkout counters. All of these devices prove ineffective when an individual is faced with criminals and is then unable to provide an alert regarding their own dangerous situation. Players in the security sector are constantly studying security methods and means that exhibit better performance and are more effective.

One known solution, described in patent application US 2011/0260859 A1, discloses a device for security on campuses, using active tags to transmit various signals to a set of readers located around the campus and operating using various technologies to receive the emitted signals.

In patent application US 2010/0052912 A1, a description is given of an RF component that enables a user to manually activate or deactivate the operability of an "ID card" by virtue of a switch. By sliding, the switch enables a current to flow by closing the metalization circuit of the loop antenna of the RF component, which becomes active so as to operate with a reader. This type of solution is applicable on the short-wave HF frequency band, in which the antennae have a small range that limits use to cards/readers that are a few centimeters apart.

The existing devices are thus either visible or easily detectable, not autonomous, and are even impractical to trigger.

In addition, there is not an integrated and autonomous device that enables discreet use and that operates on the ultra-high frequency (UHF) frequency band.

There is a need then for a solution that overcomes the drawbacks of the known approaches. The present invention addresses this need.

SUMMARY OF THE INVENTION

One object of the present invention is to propose a reliable miniature wireless alarm system.

Advantageously, the device proposed is limited in terms of electronic components, thus affording a small manufacturing cost.

The system proposed is autonomous in terms of power, thereby limiting the need to recharge it. It is moreover discreet and not easily detectable for an outside observer.

In one preferred embodiment, the alarm device of the invention comprises an RFID circuit that is configured to store identification information and that is coupled to at least one antenna designed to receive and to emit, from/to an RFID reader, signals at the frequency of the RFID reader, and a switch coupled to said at least one antenna and able to be activated by a user, enabling the antenna to be matched to the frequency of the RFID reader. The alarm device is characterized in that the circuit, the antenna and the switch are designed to be incorporated into an object worn by a user.

Advantageously, the RFID circuit is of passive or semi-active RFID type.

Advantageously, the antenna is an antenna of dipole type. In one preferred embodiment, this antenna is produced using printed technology on a dielectric substrate.

Advantageously, the identification information is an identifier of said object.

In one preferred embodiment, the frequency of the RFID reader is a frequency in the UHF band.

Advantageously, the antenna is a dipole antenna connected to the RFID circuit. In one embodiment, a second loop antenna bearing the RFID circuit is inductively coupled with the first antenna.

In one particular embodiment, the object is a ring or a band worn on the finger by the user.

In one embodiment, two radiating strands of the dipole antenna are wound around the ring, and the switch is positioned on the inner side of the hand of the user.

In another embodiment, the switch is positioned on the stub of the dipole antenna. In one variant, the switch is positioned on the upper surface of the ring. In another variant, the switch is positioned on the inner face of the ring.

DESCRIPTION OF THE FIGURES

Various aspects and advantages of the invention will appear in support of the description of one preferred, but non-limiting, mode of implementation of the invention, with reference to the figures below.

DETAILED DESCRIPTION OF THE INVENTION

The invention addresses the security of individuals working in occupations that are subject to risks of attack, whether this be indoors or outdoors. The following list, without being exhaustive, covers professions that could benefit from using the device of the present invention:

Jewelers, watchmakers and diamond dealers;
Tobacconists;
Craftspeople;
Town-based retailers and supermarket retailers;
Casino employees;
Professionals;
Shops purchasing and selling gold, watches and objects of value;
Employees in convenience stores, mass distribution, pharmacies, ticket offices in all locations, restaurants, banks and individual agents, post offices;
Prison guards;
Journalists, reporters;
Military personnel;

Personal protection and security agents and bodyguards;
Peacekeeping forces;
Emergency physicians, firefighters, home care staff.

The invention may also be extended to the security of material goods and individuals in sectors where for example there is a mandatory requirement for secure access to buildings by authorized individuals, police officers or delivery staff, for example.

Another object of the invention is more generally the security of individuals in any situation where an individual needs to trigger an alarm, such as for example an individual partaking in jogging or skiing who is confronted with a problem.

In a connected application, the device of the invention may be used to perform counts of the number of times that the RFID antenna is brought to the operating frequency of the reader. One particular example could be that of cigarette smokers having to transmit information regarding their consumption, and who would thus have to hand the RFID device with the antenna identified by a user/smoker number and able to be activated manually on request. Those skilled in the art understand that the applications derived from the device described are varied, and are linked by one and the same principle of setting, on request, the RFID antenna to the frequency of the reader.

Figure 1:
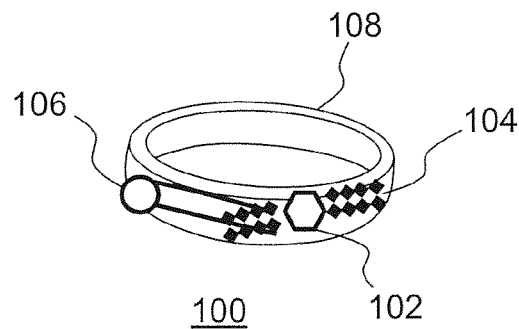
FIG. 1 is an example of the device of the invention.

More generally, the invention proposes an alarm device that is worn by a user and the activation of which is triggered by the user at their request in a discreet manner. In one preferred implementation, the device 100 of the invention as shown in FIG. 1 consists of an RFID tag 102 coupled to an antenna 104 linked to an alert pushbutton 106, all integrated into a dielectric band 108, or any support having a shape factor of ring type, for example configured to retain a discreet character for the triggering device.

Advantageously, the device is based on the principle of RFID-type short-range radiofrequency interrogation and response systems. RFID devices are known for enabling the identification of objects. The operating principle of an RFID system generally consists in that a tag, coupled and matched to an antenna, is affixed to an object, an animal or a human, so as to assign a unique identifier thereto. An RFID system traditionally consists of three main components: a tag, a reader and a host computer.

The tag, also called transponder, is formed of three major elements: a support (a card and/or other protective packaging), an antenna, and a chip provided with a memory primarily containing an identifier and linked permanently to the antenna. The RFID chip may be autonomous from a power point of view, and the tag is said to be passive if the electromagnetic wave generated by the reader suffices to provide it with its electric power supply. The tag may be of semi-passive or assisted tag type, having just one added local power source, such as a battery or capacitor, charged or able to be recharged for example by a photovoltaic cell or by mechanical kinetic energy so as to boost the return wave and have a greater range.

The reader (interrogator) is an active device capable of identifying one or more tags situated in its zone of coverage by virtue of sending an electromagnetic wave via its own antenna. This wave has a frequency that is generally defined by an RFID standard (for example 868 MHz in Europe), and said wave contains an interrogation message for the tags. The signal emitted by the reader awakens the passive tags in which the data are stored. In order for communication to be established, the antenna of the reader has to operate at the same frequency as the antenna of the tag. Advantageously, in one implementation of the present invention, the reader may be integrated into a watch or another object that is or is not worn by the user, so as to be used as a relay to mobile telephony networks, such as the known GSM900, 1800, UMTS, LTE networks, for example.

The host computer generally contains an item of driver software designed for the reader. The latter controls all of the functions of sending the interrogation messages and of receiving and exploiting the messages received in accordance with a protocol defined by the standard that is used. It may also host an item of software for monitoring/exploiting the data. Advantageously, in one implementation of the present invention, the functions of the host computer may be a chip integrated into a small object of pocket watch or smartphone type, for example.

In the example of the invention, the tag or chip is of passive or semi-active type. It contains a specific identification number that enables its activation to be recognized in a certain manner by a host computer that receives a message from the reader interrogator. The antenna or the radiating element of the interrogated system is of extremely small size, and is able to be activated manually via the pushbutton or switch.

The operating mode of the device of the invention as illustrated in FIG. 1 is as follows:

in the absence of a press on the pushbutton 106, the antenna 104 does not operate on the frequency of an RFID reader interrogator (not shown). The electronic circuit 102 of the tag is short-circuited. The system is then mismatched and does not respond to a continuous interrogator signal originating from the RFID reader.

in the case of a press on the pushbutton, intended to activate the alarm, the antenna 104 and the electronic circuit 102 become matched to the frequency of the interrogator signal. Preferably, the operating frequency is that of the UHF band, ranging from 860 to 960 MHz. The signal received by the antenna 104 is then transmitted to the electronic circuit 102, which extracts therefrom enough power for its operation, its clock and the content of the interrogation message. Using the power recovered, the electronic circuit 102 constructs its response message, including the identifier that it stores, and transmits it to the antenna 104. The antenna returns an electromagnetic wave to the reader interrogator at the appropriate frequency. The interrogator system then receives the specific identifier of the ring, which will be processed by the host computer and recognized as being an alert message. A remote intervention may then be triggered.

On the basis of these principles, implementation variants may be envisioned regarding the shape and the implementation of the antenna 104, for example, regarding the operating frequency of the passive RFID device, and regarding the configuration of the pushbutton 106, which configuration may be adjusted for example via simple contact of the finger on the antenna. Moreover, the device of the invention may be adjusted on the basis of one or more of its features according to the field of use.

One major technical feature of the device of the invention is the miniature antenna 104, which has to be as effective as possible in order to be used in an object having a particular shape factor that offers a small volume or area of implementation. Specifically, the integration of the antenna into the communicating object is the central element of the radiofrequency link, and enables reliability of the anticipated communication to be ensured.

Unlike antennae for low-frequency tags, which are loops or coils, known antennae for high-frequency tags are antennae of simple linear wire type.

Miniaturizing these antennae is accompanied by a deterioration in their performance, such as their bandwidth and their radiation gain. Moreover, the environment in the vicinity of the antenna, formed above all by the body of the user, cannot be ignored. This sensitivity poses a major problem regarding the gain of the antenna, and may bring about modifications of the input impedance. Therefore, the inventors have had to find the best compromise between the electrical characteristics of the antenna, its radiation efficiency and the volume it occupies. Thus, for the example of a ring as illustrated in FIG. 1, the volume reserved for the antenna may be restricted to an area of 15×18 mm$^2$. Several implementation variants of a miniature antenna on this type of object are proposed.

Figure 2:
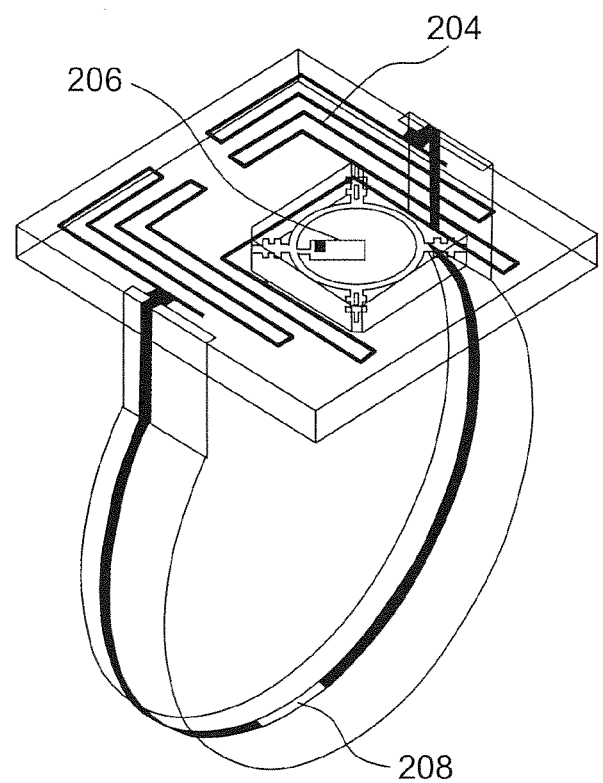
FIG. 2 illustrates a first implementation variant of the device of FIG. 1.

FIG. 2 illustrates a first implementation variant of the device of FIG. 1, in which the antenna 104 is a dipole antenna 204 that is inductively coupled with an RFID circuit 206 incorporating a coupling loop supporting the RFID chip. In one preferred embodiment, this antenna is produced using printed technology on a dielectric substrate.

The dipole antenna is an antenna consisting of two metal strands, supplied at the middle thereof and intended to transmit or receive electromagnetic energy.

In this embodiment, the dipole antenna is modified such that its two radiating strands are wound around the band of the ring. This option enables the addition, in a discreet manner, of a switch 208 on the inner side of the hand of the user. When the switch is closed, the dipole antenna is "off", and does not transmit, and when the switch is open, the dipole antenna is "on", and is able to transmit the identifier of the ring to the reader.

The switch is chosen in a precise manner, in order to prevent mismatching of the antenna in the case where the latter is "ON". Specifically, given the short travel of the contactor, an up/down contact switch would exhibit the risk of not behaving as a true open circuit, but of leaving in place the equivalent of a capacitor, which would tend to reduce the difference between the activated state and non-activated state. At UHF operating frequencies, the positioning of a simple switch does not suffice to prevent or allow the operation of the RFID tag by way of selecting a metal strand in order to prevent the flow of current. The capacitive effects are such that the antenna plus circuit system continues to operate. Therefore, a switch in which the metal contact portion slides rather than goes down may be preferable.

One actual implementation of this variant consists in optimizing the structure of the dipole antenna on a Duroid substrate with low permittivity, so as to obtain good matching with the desired operating frequencies (868 MHz). The two strands of the dipole are printed on a thin layer of Duroid, having a thickness of 0.127 mm for example. The structure of the band of the ring is made of plexiglass material. The RFID circuit is a circuit of MuTRACK® type. The switch is chosen so as to have an open contact of the order of 3 mm.

Figure 3A:
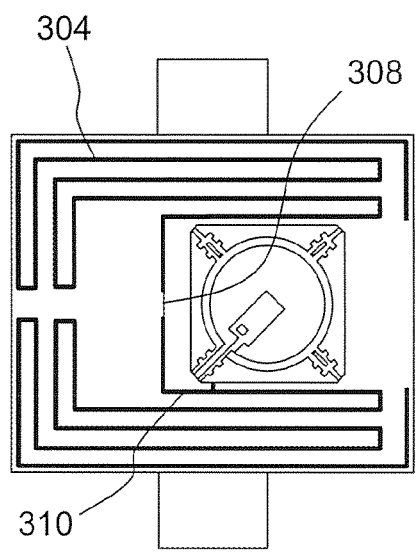
FIGS. 3a and 3b illustrate a second implementation variant of the device of FIG. 1.
Figure 3B:
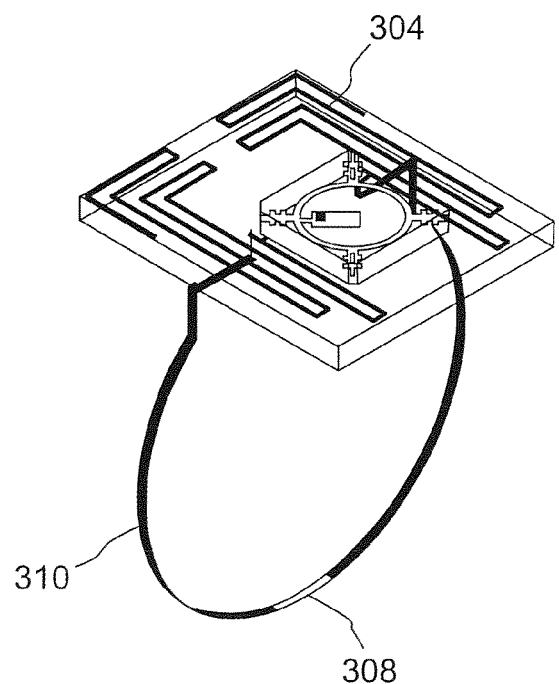

FIGS. 3a and 3b illustrate a second implementation variant of the device of FIG. 1, in which the switch is positioned directly on the stub of the dipole antenna, that is to say on the line section that enables the matching of the dipole to be controlled. The switch acts as a load positioned at the stub end. Depending on whether it is open or closed, the stub returns a load to the antenna, which is able to match it, and completely mismatch it in order to prevent it from radiating or from receiving.

In FIG. 3a, the switch is positioned on the upper surface of the ring. In the variant of FIG. 3b, the switch is positioned on the inner face of the ring.

The embodiment of FIG. 3a consists in positioning the switch 308 on the stub 310 without the need to modify the initial structure of the dipole antenna 304, that is to say directly on the upper face of the ring. The advantage of this method lies in its simplicity from an implementation point of view, but, on the other hand, the location of the switch on the upper face of the ring may pose problems with regard to discreetly actuating the triggering of the alarm.

In the embodiment of FIG. 3b, the structure of the dipole antenna 304 is modified, and the section of the stub 310 is wound around the band of the ring so as to enable the switch 308 to be located on the inside of the hand of the user. In this variant, the antenna system is matched when the switch is closed and the identifier of the ring is able to be sent to the reader. In one actual implementation, the antenna, incorporating the loop stub, enables the entire antenna structure to be matched with respect to a supply impedance that is close to the input impedance of the RFID chip, thus enabling a bandwidth of 7 MHz around 868 MHz to be obtained, for a coefficient of reflection of less than −10 dB.

Figure 4:
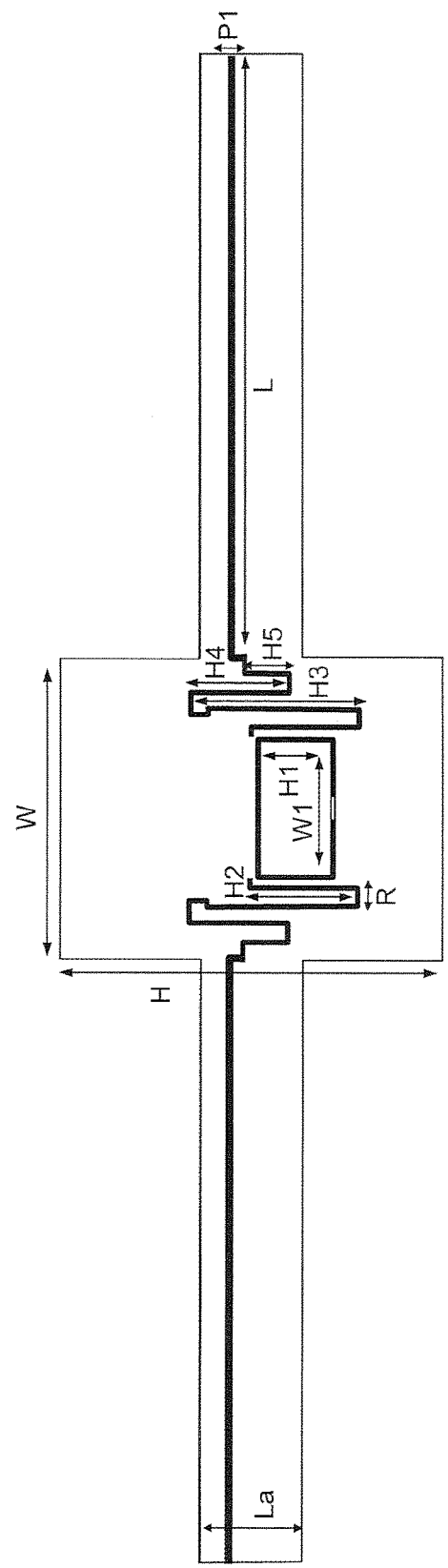
FIG. 4 illustrates an embodiment of the invention with two loop antennae.

In another mode of implementation, a second loop antenna of small size may be coupled inductively to the large antenna. The location of the switch on the large loop antenna on the inside of the hand of the user enables the radiation from the entire structure to be activated/deactivated, regardless of the geometry of the switch. FIG. 4 shows a plan view of the two loop antennae printed on one and the same low-thickness substrate able to be bent onto the structure of the ring that carries the device.

The following table gives preferred dimensions for a concrete implementation of the device:

| | |
|---|---|
| L = 29.4 mm | H = 18 mm |
| $L_a$ = 5 mm | H1 = 3 mm |
| R = 1.2 mm | H2 = 5.4 mm |
| P = 0.35 mm | H3 = 6.6 mm |
| P1 = 0.5 mm | H4 = 4.6 mm |
| W = 15 mm | H5 = 2 mm |

The present description thus illustrates various non-limiting implementations of the invention. Some examples have been described so as to enable a good understanding of the principles of the invention, but these are in no way exhaustive, and should enable those skilled in the art to provide modifications and implementation variants while keeping the same principles.

The invention claimed is:

1. A wireless alarm device comprising:
   an RFID circuit that is configured to store identification information and that is coupled to at least one antenna designed to receive and to emit, from and to an RFID reader, signals at the frequency of the RFID reader; and
   a switch coupled to said at least one antenna and able to be activated by a user, enabling the antenna to be matched to the frequency of the RFID reader, wherein
   the RFID circuit, the at least one antenna, and the switch are designed to be incorporated into an object worn by the user;
   the object is a ring or a band worn on a finger of the user,
   the at least one antenna is a dipole antenna,
   two radiating strands of the dipole antenna are wound around the ring or the band, and
   the switch is positioned on the inner side of a hand of the user.

2. The device as claimed in claim 1, wherein the RFID circuit is of passive or semi-active RFID type.

3. The device as claimed in claim 1, wherein the identification information is an identifier of said object.

4. The device as claimed in claim 1, wherein the frequency of the RFID reader is a frequency in the UHF band.

5. The device as claimed in claim 1, wherein the at least one antenna is inductively coupled with the RFID circuit.

6. The device as claimed in claim 5, further comprising a second antenna inductively coupled with the at least one antenna.

7. The device as claimed in claim 1, wherein
the switch is positioned on a stub of the dipole antenna.

8. The device as claimed in claim 1, wherein the object is the ring and the switch is positioned on an upper surface of the ring.

9. The device as claimed in claim 1, wherein the object is the ring and the switch is positioned on an inner face of the ring.

\* \* \* \* \*